United States Patent
Kasugai et al.

Patent Number: 5,577,526
Date of Patent: Nov. 26, 1996

[54] FLOAT VALVE FOR FUEL TANK

[75] Inventors: Joji Kasugai, Ichinomiya; Yoshihiro Nagino, Inazawa, both of Japan

[73] Assignee: Toyoda Gosei Co., Ltd., Japan

[21] Appl. No.: 426,140

[22] Filed: Apr. 21, 1995

[30] Foreign Application Priority Data

Apr. 28, 1994 [JP] Japan ................................ 6-091598

[51] Int. Cl.⁶ .............................................. F16K 31/18
[52] U.S. Cl. ........................... 137/202; 137/43; 137/587
[58] Field of Search ............................ 137/43, 202, 587

[56] References Cited

U.S. PATENT DOCUMENTS

| | | |
|---|---|---|
| 4,000,828 | 1/1977 | Crute et al. |
| 4,679,581 | 7/1987 | Mears |
| 4,905,726 | 3/1990 | Kasugai et al. |
| 4,913,303 | 4/1990 | Harris |
| 5,028,244 | 7/1991 | Szlaga |
| 5,156,178 | 10/1992 | Harris |
| 5,443,561 | 8/1995 | Sakata et al. ............... 137/202 |

FOREIGN PATENT DOCUMENTS 4-39061 9/1992 Japan.
5-185850 7/1993 Japan.

*Primary Examiner*—Gerald A. Michalsky
*Attorney, Agent, or Firm*—Cushman Darby & Cushman, L.L.P.

[57] ABSTRACT

A float valve for a fuel tank, which comprises an upper float chamber, a middle chamber, and a lower float chamber housed in a case that is fixed to the upper wall of a fuel tank. The upper float chamber includes a first communication hole that directly communicates with an air bleed duct. The upper float that can block that first communication hole when the tank is full. The middle chamber includes a third communication hole communicating with the lower float chamber which has a first air hole located at a position corresponding to the desired fuel level for a full tank. The lower float chamber includes a lower float than can block the third communication hole, and a second air hole which is located bellow the lower float. Because the air passages and float activation allow air to be vented as the fuel level rises in the tank fueling proceeds smoothly and drastic increases in internal pressure, that will stop fueling prematurely can be avoided.

2 Claims, 6 Drawing Sheets

FLOAT VALVE FOR FUEL TANK

BACKGROUND OF THE INVENTION

1. Field of the Invention

The present invention relates to a fuel tank float valve located at an air bleed duct in an upper portion of the fuel tank. The valve bleeds air in the fuel tank during fueling, and also stops air flow if the fuel liquid level rises to the feeding-up position of the fuel tank.

2. Description of the Related Art

Heretofore, float valves that are located in fuel tanks are proposed in Japanese Patent Laid-Open No. 5-185850, Japanese Utility Model Publication No. 4-39061 and have a structure as shown in FIG. 1.

This type of float valve V0 comprises a float 5 positioned inside a cylindrical case 1 that is, in turn, fixed to an upper wall 9 of the fuel tank 8. In addition, the case 1 comprises a top wall 2 having a communication hole 2a that communicates with an air bleed duct 7, a bottom wall 3 that is located below the top wall 2, and a side wall 4 connecting the top wall 2 and bottom wall 4.

A through-hole 3a and an air hole 4a are formed in the bottom wall 3 and side wall 4 respectively in order to enable fuel F and air A to flow into the case 1.

A valve portion 5a, that can block the air bleed duct 7, is formed above the float 5, and a compression spring 6 is located between the float 5 and bottom wall 3.

Compression spring 6 supports float 5 so as to block the communication hole 2a in case a car inclines or turns over in an accident. That is, for example, if the car turns over, the communication hole 2a would lie below float 5. However, the spring load of the compression spring 6 is set so that the sum of mass of the float 5 and repulsive force of the compression spring 6 may be bigger than buoyancy of the float 5. Of course, the spring load of the compression spring 6 does not raise the float 5 to block the communication hole 2a before the fuel F rises in case the car is in a proper posture. However, the spring load of compression spring 6 is set within a range so the sum of the buoyancy of float 5 and the repulsive force of the compression spring 6 is bigger than the mass of float 5.

Therefore, in this type of float valve V0, if the fuel liquid level in fuel tank 8 rises in a normal manner, fuel F flows into case 1 through through-hole 3a and air flows through the air hole 4a, and the fuel raises the float 5. Therefore, since the valve portion 5a blocks the communication hole 2a when float 5 rises enough, the float valve can then prevent an outflow of the fuel F from the fuel tank 8. In addition, air that passed the communication hole 2a and air bleed duct 7 is sent to a canister (not shown).

However, rapid flow of fuel during filling can cause problems with use of a conventional type float valve V0.

Because air A rushes into the case 1 from the air hole 4a during rapid fueling, the flow velocity of the air A that is bled out to the air bleed duct 7 increases rapidly, and hence a flow of the air A generates lift and raises float 5. Also the fuel F flows into the case 1 from the through-hole 3a, in the bottom wall 3 of the case 1, so that float 5 rises by the lift caused by the fuel F. Then, before the fuel liquid level rises to a fuel level LF, where the float 5 is located at a proper valve-closing position where tank 8 is considered to be full, the valve portion 5a sometimes blocks the communication hole 2a due to the flow of the air A. This valve-closing operation easily occurs because the downward force acting on float 5 (a residual value after the lift of the float and the repulsive force of the compression spring is subtracted from the mass of the float) becomes small especially when the float generates lift caused by fuel F.

Furthermore, since such valve-closing operation suddenly stops the flow of the air A that is bled out of the fuel tank 8 during fueling, the valve-closing operation quickly raises internal pressure in the fuel tank 8. Thus, at the fuel inlet of the fuel tank 8, the valve-closing operation can result in additional problems.

That is, although problems do not arise where internal pressure in the fuel tank gradually rises, it is not desirable that the internal pressure in the fuel tank 8 the rises instantaneously or drastically as can occur if of the flow of the air A is stopped as above described. Because the internal pressure in the above state generates back pressure on the fuel extending to the fuel inlet, the back pressure suddenly activates an automatic stop mechanism in the fuel nozzle that detects and reacts to increased internal pressure in the fuel tank, whose level is more than the regular value, and acts. Consequently, the automatic stop mechanism stops fuel feeding prematurely, and hence the desired amount of the fuel to fill the tank will not be fed.

As a countermeasure to these issues, Japanese Utility Model Laid-Open No. 63-137033 and so forth propose to install a check-valve at the fuel inlet, but this is not desirable because the number of parts used in the fuel tank increases.

SUMMARY OF THE INVENTION

The present invention has been designed to solve these problems. The object of the present invention is to provide a float valve for a fuel tank which allows fueling to be smoothly performed and which allows the fuel tank to be correctly filled by preventing drastic rises of internal pressure in the fuel tank.

That is, the float valve for the fuel tank according to the present invention is located at an air bleed duct in an upper portion of a fuel tank, that bleeds air in the fuel tank during fueling, and stops air flow when the fuel liquid level rises to the desired full fuel level. The float valve for the fuel tank includes, from top to bottom, an upper float chamber, a middle chamber, and a lower float chamber formed in a case that is fixed to the upper wall of the fuel tank. In addition, the upper float chamber comprises a first side wall having a first communication hole communicating with the air bleed duct; a second side wall, which is located under the first side wall, having a second communication hole communicating with the middle chamber; and an upper side wall connecting the first side wall to the second side wall. Furthermore, the upper float chamber internally has an upper float that can block the first communication hole. The middle chamber is comprised of second and third side walls, with the third located under the second side wall. The third side will contain a third communication hole communicating with the lower float chamber. Also included is a middle side wall connecting the second side wall to the third side wall. In addition, the middle chamber has a first air hole that is located at a full fuel liquid level in the middle side wall. Furthermore, the lower float chamber comprises the third side wall, a fourth side wall that is located under the third side wall; and a lower side wall. The lower float chamber also includes an internal lower float that can block the third communication hole, and a second air hole is provided in the fourth side wall.

In the above-described float valve for the fuel tank, it is desirable to extend the middle chamber downward so that the middle chamber may cover the lower float chamber for setting, as equal to or less than 5 mm, the distance between the first air hole and a second air hole located at a point lower than the first air hole.

In the float valve for the fuel tank according to the present invention, during fueling of the fuel tank, lift is not generated in the lower and upper floats because the lower and upper floats are not affected by fuel until the fuel liquid level in the tank rises to the position of the second air hole.

Even if lift is generated, it is possible to prevent blocking of the first and third communication holes by both floats. Therefore, there remains a sufficient flow path to allow air to be bled out to the air bleed duct from the first communication hole along a path through the first and second air holes, the lower float chamber, the middle chamber, and the upper float chamber.

After that, when the fuel liquid level arrives at the position of the first air hole, after passing through the position of the second air hole, the lower float rises and blocks the third communication hole because the lower float will be in contact with the fuel and, consequently, be lifted.

When the third communication hole is blocked by the lower float, the first air hole is not yet blocked but remains open since the fuel liquid level has not arrived at the first air hole. Therefore, air continues to flow to the air bleed duct through the first air hole, the middle chamber, the second communication hole, the upper float chamber, and the first communication hole. As a result, the internal pressure in the fuel tank does not rise drastically, but gradually rises. Accordingly, the fuel nozzle does not activate an automatic stop mechanism so fueling continues unaffected.

Subsequently, if the fuel liquid level arrives at the position where the first air hole is blocked, the fuel then flows into the upper float chamber through the first air hole, the middle chamber, and the second communication hole. Consequently, the upper float rises by the lift created by the fuel contacting the upper float and subsequently blocks the first communication hole. Thereafter, the internal pressure in the fuel tank rises to the predetermined value where the automatic stop mechanism is activated by back pressure so that the feeding of fuel is stopped.

When the fuel liquid level arrives at the position of the first air hole, the fuel will be at the desired full level in the fuel tank.

Therefore, use of the float valve according to the present invention, allows fueling to be smoothly performed to properly fill the tank with no drastic rise of internal pressure in the fuel tank.

In addition, the middle chamber can be extended downward so that the middle chamber covers the lower float chamber for setting, as equal to or less than 5 mm, the distance between the first air hole and second air hole. In this case, it is possible to reduce the period over which the fuel liquid level moves from the position of the second air hole to the position of the first air hole. That is, the period between the time when the internal pressure in the fuel tank gradually rises and the time when the internal pressure in the fuel tank arrives at the predetermined value at which back pressure activates the automatic stop mechanism. Thus, even if the fuel is fed at an extremely large flow rate (fast fuel feeding speed), it is possible to stabilize the position of the fuel liquid level at the desired full condition.

Other objects, features, and characteristics of the present invention will become apparent upon consideration of the following description in the appended claims with reference to the accompanying drawings, all of which form a part of the specification, and wherein referenced numerals designate corresponding parts in the various figures.

PREFERRED EMBODIMENT OF THE INVENTION

Hereinafter, an embodiment of the present invention will be described, with reference to the drawings.

Figure 1:
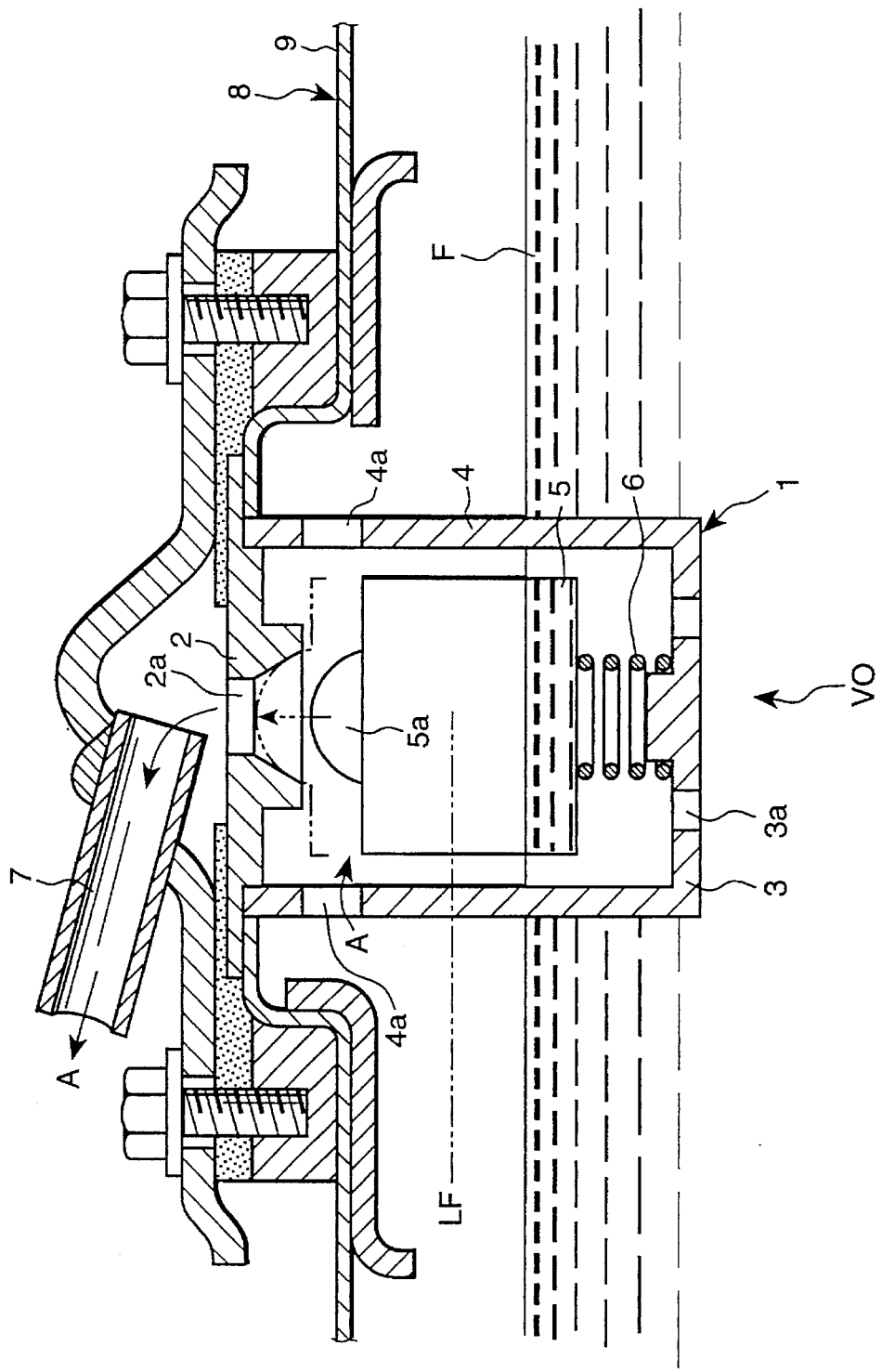
FIG. 1 is a cross-sectional view showing a conventional float valve.
Figure 2:
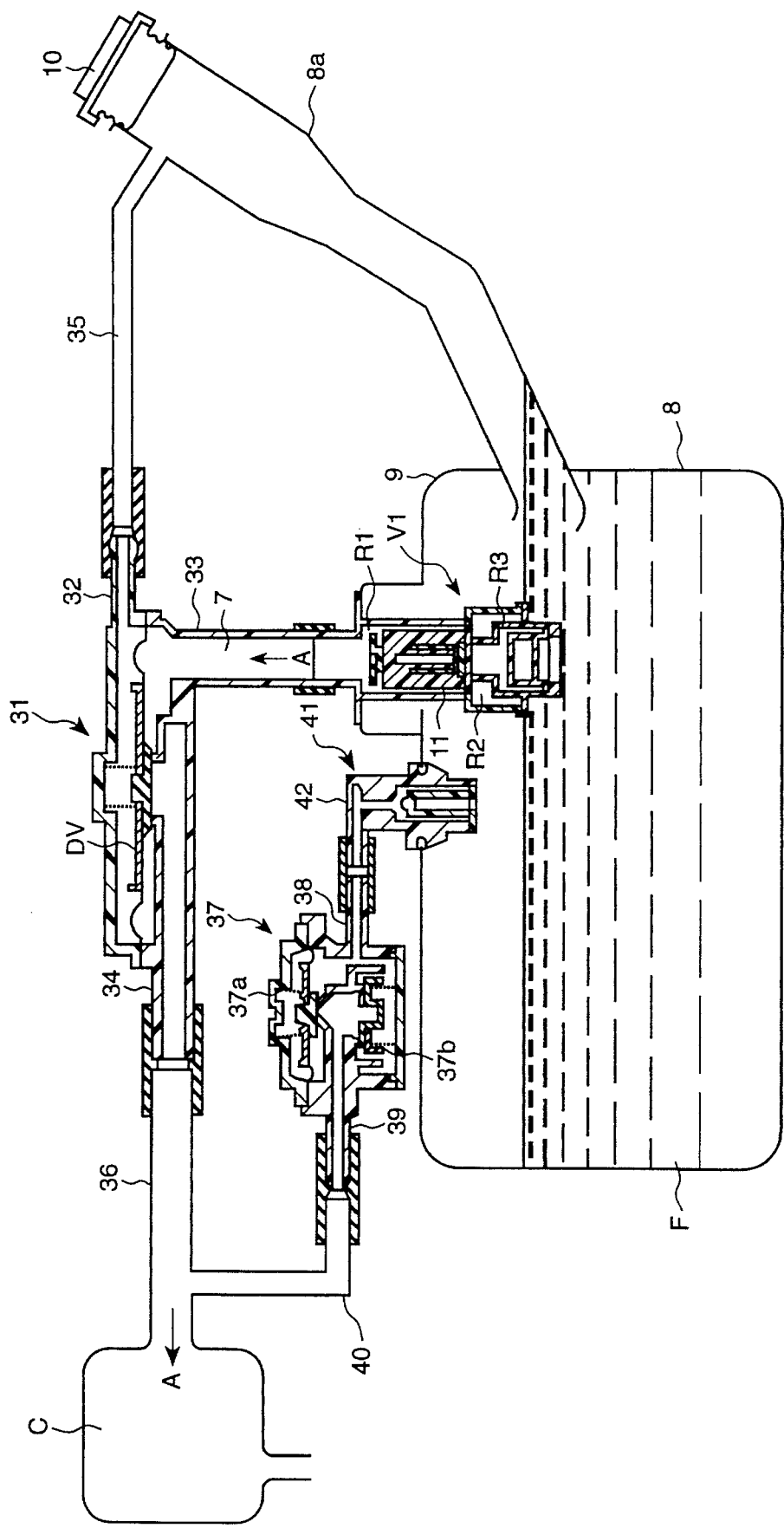
FIG. 2 is a cross-sectional view showing a float valve of an embodiment according to the present invention, and shows the location of the float valve in a fuel tank.

A float valve V1 is designed for use in a fuel tank located as shown in FIG. 2. The value V1 is fixed to an upper wall 9 of the fuel tank 8, and permits a flow of air A during fueling to a canister C, A that includes a quantity of vaporized fuel. A differential pressure control valve 31 is installed in an air bleed duct 7 that forms part of the connection between the float valve V1 and canister C. The differential pressure control valve 31 includes a diaphragm valve DV, and enables a nipple 32 to connect to a pipe 35 that, in turn, is connected to a filler pipe 8a which functions as the fuel inlet to fuel tank 8. Furthermore, the differential pressure control valve 31 includes conduit 33 connected to the float valve V1, and a conduit 34 connected to a pipe 36 that connects directly to the canister C. In this embodiment the air bleed duct 7 is comprised of conduits 33 and 34, pipe 36 and the diaphragm valve DV. During fueling, pressure in conduit 33 becomes higher than that in the pipe 35, and hence the differential pressure control valve 31 opens allowing conduit 33 to communicate with conduit 34. Therefore, during fueling vaporized fuel is vented to the canister C through the air bleed duct 7.

In addition, a float valve 41 is also installed on the upper wall 9 of the fuel tank 8 for venting a small amount of air A, including vaporized fuel, to the canister C except during fueling. This float valve 41 is connected to a positive/negative pressure valve 37 through pipes 38 and 42 and the positive/negative pressure valve 37 is connected to the canister C through pipers 39 and 40. The positive/ negative pressure valve 37 includes a positive pressure valve 37a and a negative pressure valve 37b and the pressure for opening the positive pressure valve 37a is more than that of the differential pressure control valve 31. Therefore, when the fuel F is not fed, the pressure in fuel tank 8 does not differ from the pressure in pipe 35, so that the differential pressure control valve 31 is closed. If the pressure in fuel tank becomes equal to or more than a desired value, the positive pressure valve 37a opens and bleeds or vents A out of the tank toward canister C. In addition, if the pressure in the fuel tank develops a negative pressure, that is equal to or less than a desired value, the negative pressure valve 37b opens.

Furthermore, the fuel tank 8 is connected to a pipe for fuel feeding toward an engine (not shown) and a pipe for fuel return.

Figure 3:
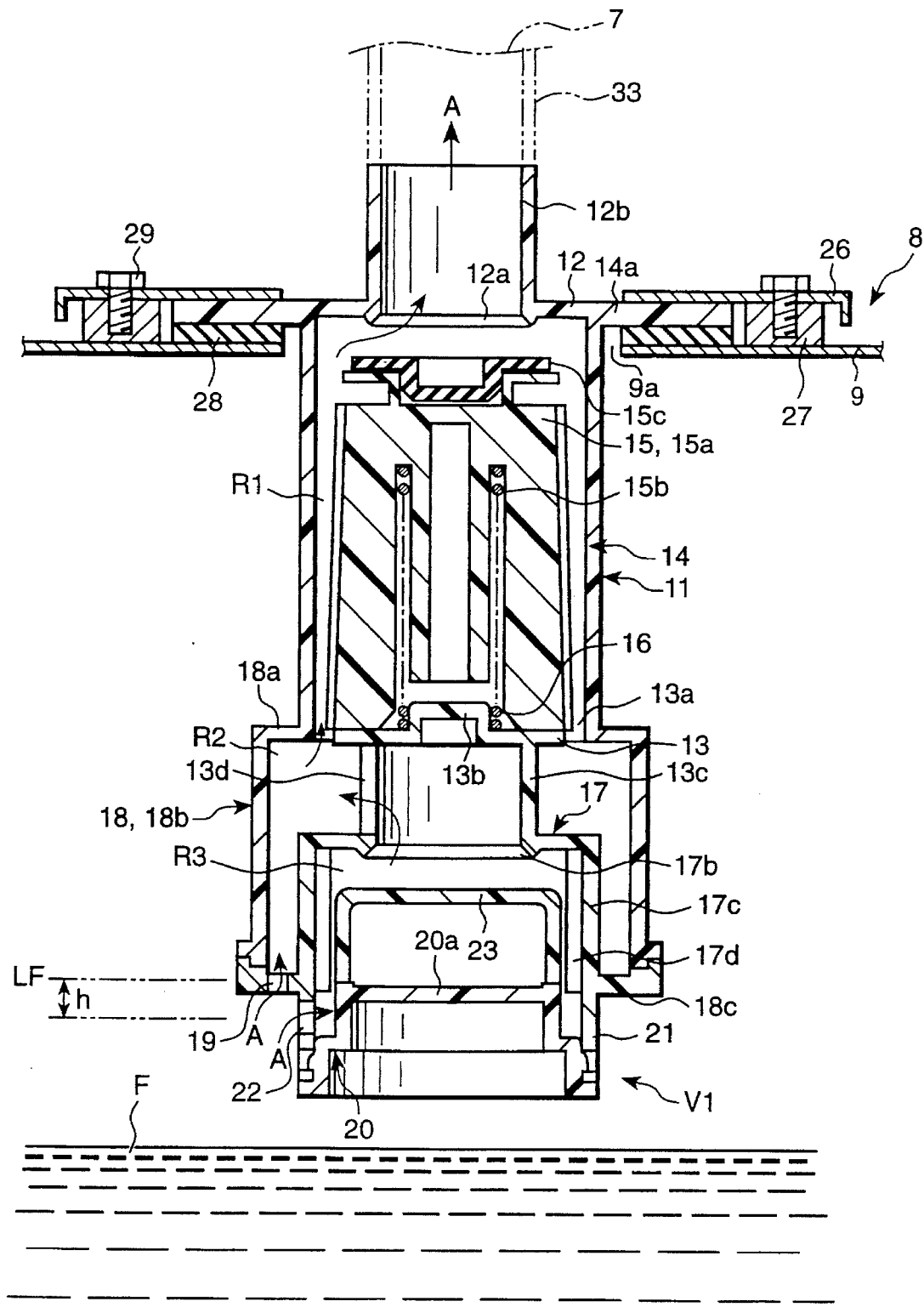
FIG. 3 is an enlarged cross-sectional view thereof.

The float valve V1 of the embodiment, as shown in FIGS. 2 and 3, has an approximately cylindrical case 11 that is fixed to the upper wall 9 of the fuel tank.

Case 11 is preferably formed from a plastic resin, such as polyacetal or polyamide, that has fuel resistance characteristics, and comprises, from top to bottom, an upper float chamber R1, middle chamber R2, and a lower float chamber R3.

The upper float chamber R1 comprises a first side wall 12 having, in the center, a first communication hole 12a communicating toward the air bleed duct 7; a second side wall 13, which is located under the first side wall 12, forming, near the outer circumference, a second anchor ring-shaped communication hole 13a, which is located below the first side wall 12, communicating with the middle chamber; and an upper cylindrical side wall 14 connecting the first side wall 12 to the second side wall 13.

The first side wall 12 has a nipple 12b extending upward from the circumference of the first communication hole 12a, with nipple 12b is connected to conduit 33 of the differential pressure control valve 31.

The second side wall 13 has, in the center, a convex portion 13b, which protrudes upward to retain a compression spring 16 that is described below. In addition, the second side wall 13 is connected to a third side wall 17 by a cylindrical supporting rib 13c. Use of shaping dies for case 11, and in order to assemble the upper float 15, a large through-hole 13d is formed in the supporting rib 13c.

On the upper outer circumference of the upper side wall 14, a flange 14a is protrusively provided, which joins with a circumference of a through-hole 9a of the upper wall 9 of the fuel tank through an anchor ring-shaped gasket 28. In addition, the upper surface of the flange 14a is pressed with an approximately anchor ring-shaped shrouding ring 26. The flange 14a is fixed on the upper wall 9 of the fuel tank 8 by bolting the shrouding ring 16 with an anchor ring-shaped mouth ring 27 that is fixed on the circumference of the through-hole 9a, thereby fixing case 11 to the upper wall 9 of the fuel tank 8.

The upper float chamber R1 internally has the upper float 15 that can block the first communication hole 12a. The upper float 15 comprises an approximately cylindrical body 15a formed from a plastic resin, such as polyacetal or polyamide, that has fuel resistance and generates lift caused by fuel F. Upper float 15 also includes a valve portion 15c that is formed with rubber material, such as fluoro rubber or nitrile rubber, that is assembled on the upper portion of the body 15a and can closely contact the first communication hole 12a.

A compression spring 16 is located between the body 15a of the upper float 15 and the second side wall 13. The upper end of spring 16 is located in a concave slot 15b, and the lower end is retained by a convex portion 13b. This compression spring 16 is a supporting member for supporting the upper float 15 so to block the first communication hole 12a in case a car inclines severely or turns over.

The middle chamber R2 comprises: the second side wall 13, a third side wall 17, which is located under the second side wall 13 and has, in the center, a third communication hole 17b communicating with the lower float chamber R3. Also included is a middle side wall 18, whose form is approximately cylindrical, for connecting the second side wall 13 to the third side wall 17.

In this embodiment, the middle chamber R2 is composed so as to cover the lower float chamber R3, so the third sidewall 17 comprises a disk-shaped top wall with the third communication hole 17b in the center. Also, a cylindrical portion 17c extends downward from the outer circumference of wall 17a. In addition, the cylindrical portion 17c has a plurality of ribs 17d for guiding a lower float 23 that is described below.

The middle side wall 18 comprises an anchor ring-shaped top wall portion 18a, protruding outward from the lower end of the upper side wall 14, a cylindrical side wall body portion 18b extending downward from the outer circumference of top wall portion 18a so as to cover the lower float chamber R3, and a bottom wall portion 18c connecting the lower end of the side wall body portion 18b to the lower end of the cylindrical portion 17c of the third side wall 17. In addition, in arranging the shaping dies for the molding of case 11, the top wall portion 18a and side wall body portion 18b are formed about the upper float chamber R1, the bottom wall portion 18c is formed about the lower float chamber R3, and the side wall body portion 18b and the bottom wall portion 18c are, for example, connected together by solvent-welding.

A predetermined number of first air holes 19 are formed in the bottom wall portion 18c of the middle side wall 18. The position of these air holes 19, that is, the position of the bottom wall portion 18c, is determined so as to coincide with a position LF of a fuel liquid level at which the fuel tank is full.

The lower float chamber R3 includes the third side wall 17, a fourth side wall 20, which is located under the third side wall 17, and a lower side wall 21 connecting the lower end of the cylindrical portion 17c, of the third side wall 17, to the outer circumference of the fourth side wall 20.

The fourth side wall 20 can also, for example, be solvent-welded to the inner circumference of the lower end of the lower wall 21. Due to the design of the shaping dies, the assembling of the lower float 23 as described below, and has a central supporting plate 20a protruding upward which supports the lower float 23.

The lower float chamber R3 internally has the lower float 23 that can block the third communication hole 17b in the third side wall 17. The lower float 23 is also formed from a plastic resin, such as polyacetal or polyamide, that has fuel resistance.

A predetermined number of second air holes 22 are also formed in the lower side wall 21 that is located below the lower float 23. In this embodiment, each opening area of the second air holes 22 is larger than each opening area of the first air holes 19. In addition, the distance between the second air holes 22 and first air holes 19 is equal to or less than 5 mm. Preferably, the distance is about 2 mm.

When the fuel F is fed into the fuel tank 8 that includes the float valve V1, a fuel nozzle (not shown) is inserted into the filler pipe 8a after removing a fuel cap 10. Fueling can then proceed.

When this fueling sequence begins no lift is generated in either the lower float 23 or the upper float 15 because the lower float 23 and upper float 15 will not yet have been contacted by fuel. In fact, no lift from floating of either float will occur until the fuel liquid level rises to the position of the second air hole 22. Even if some lift is generated, floats 15 and 23 will not block the first communication hole 12a and third communication hole 17b, respectively. Therefore, air A continues to be vented to the air bleed duct 7 from the first communication hole 12a through the first and second air holes 19 and 22, through the lower float chamber R3, the middle chamber R2, into the and upper float chamber R1.

Figure 4:
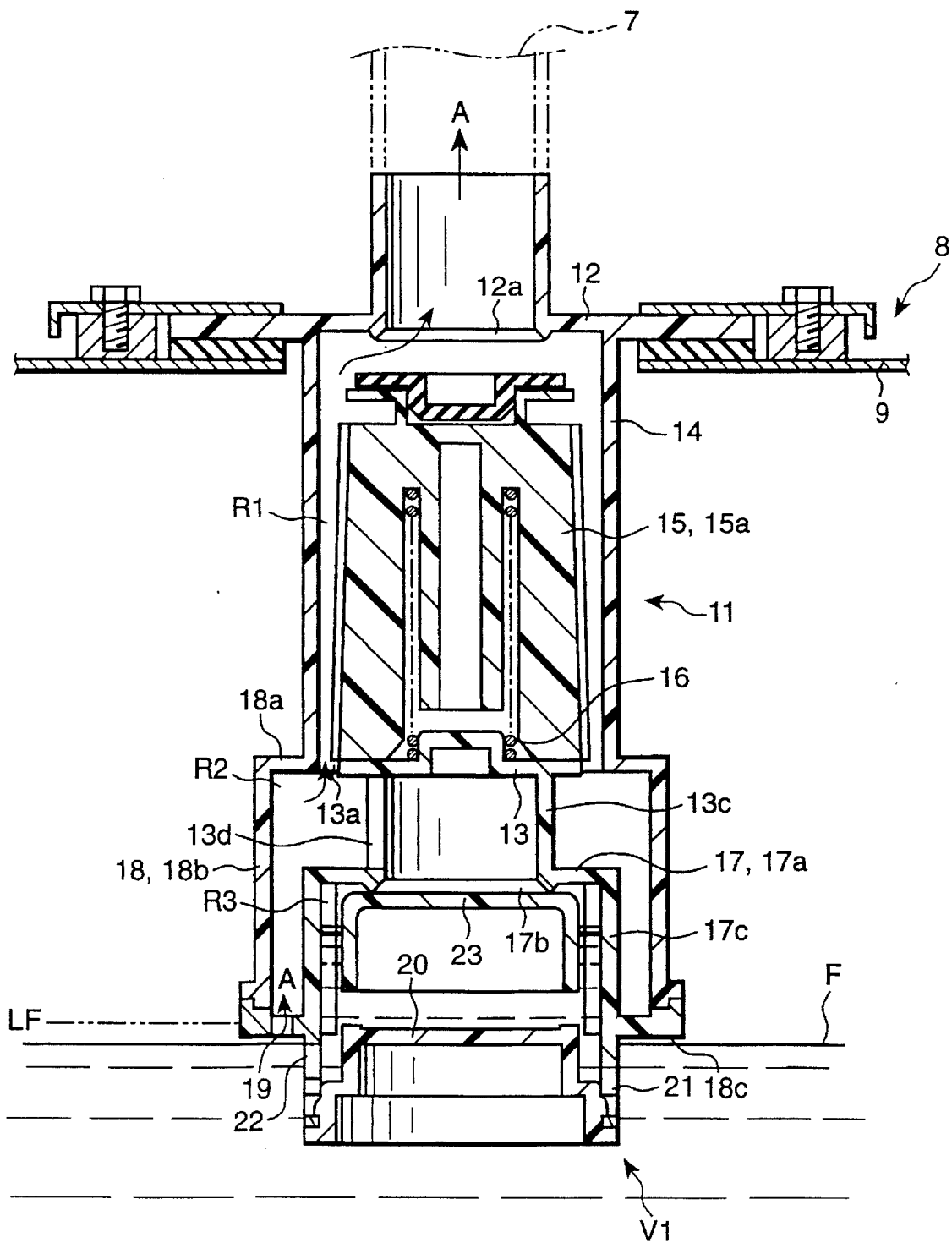
FIG. 4 is an enlarged cross-sectional view thereof at a higher fuel level.

After that, until the fuel liquid level arrives at the position of the first air hole 19, after passing through the position of the second air hole 22, the lower float 23 rises and subsequently blocks the third communication hole 17b, as is shown in FIG. 4. The lower float 23 rises when the fuel F has entered the second hole 22 and the lower float chamber R3 so that lower float 23 is contacted by fuel and consequently generates the lift.

While the third communication hole 17b is now blocked by the lower float 23, since the fuel liquid level is not yet at the level of the first air hole 19, the first air hole 19 is not blocked and allows air flow to continue. Therefore, air flow A continues to be vented to the air bleed duct 7 through the first air hole 19, through the middle chamber R2, the second communication hole 13a, through upper float chamber R1, and then out the first communication hole 12a. Thus, the internal pressure in the fuel tank does not rise drastically, but gradually rises, and hence the fuel feeding nozzle does not activate an automatic stop mechanism so that fuel feeding can be continued.

Figure 5:
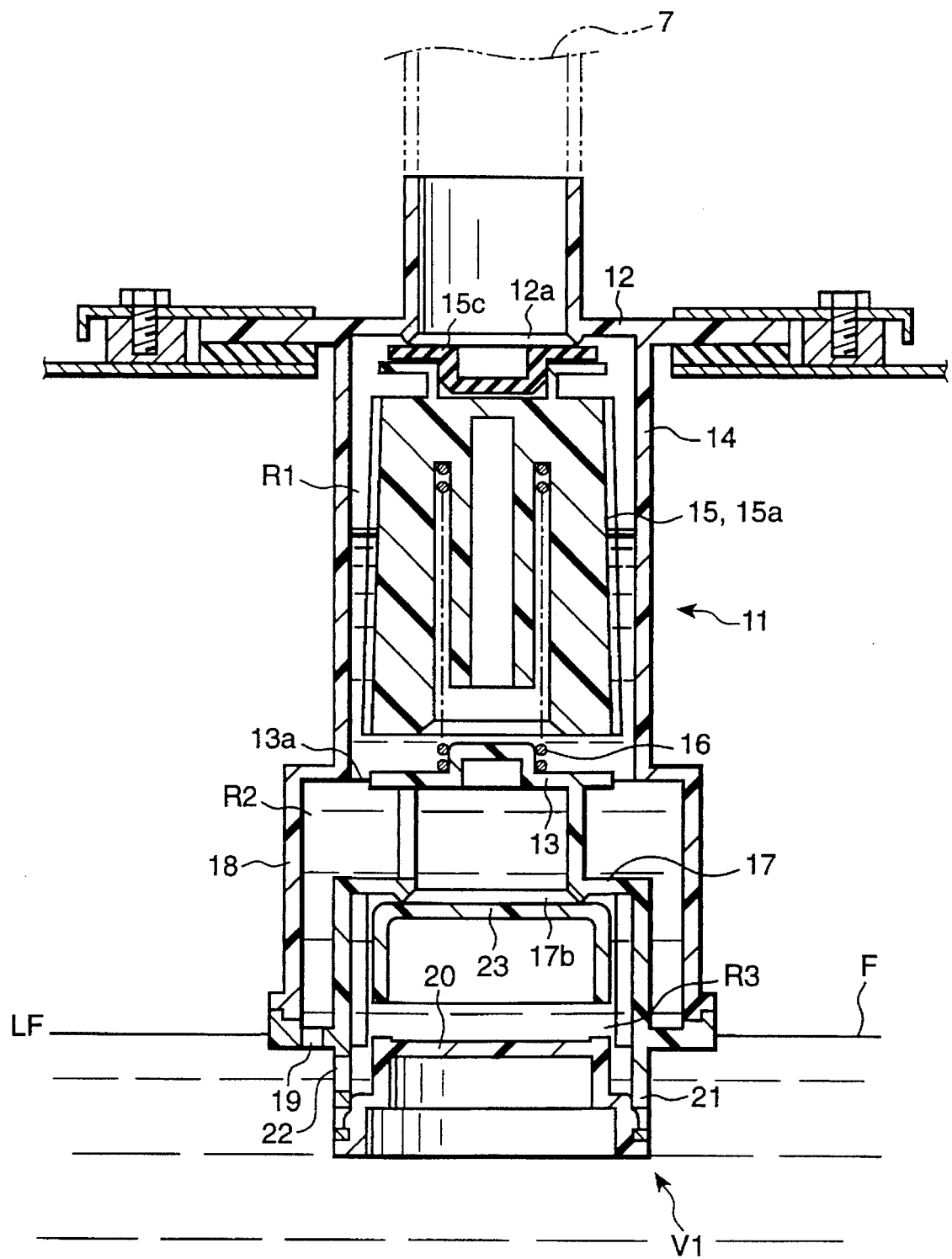
FIG. 5 is an enlarged cross-sectional view thereof showing a closed valve.

Subsequently, if the fuel liquid level arrives at the position where the first air hole 19 is blocked, as shown in FIG. 5, the fuel F flows into the upper float chamber R1 through the first air hole 19, into the middle chamber R2, and through the second communication hole 13a. Hence, the upper float 15 rises by the lift created due to its buoyancy in the fuel and blocks the first communication hole 12a. Therefore, with the air vent holes blocked the internal pressure in the fuel tank then rises to the predetermined value, and the fuel nozzle activates the automatic stop mechanism so that fuel feeding is stopped.

With the fuel liquid level at the position of the first air hole 19, that corresponds to a fuel level for a full tank.

This operational sequence of the float valve V1 permits this fuel feeding be smoothly performed and allows for the fuel tank to be filled to the desired level by preventing the instantaneous and drastic rise of internal pressure in the fuel tank that would, if present, stop the fueling process too soon.

In addition, in this float valve V1, a valve portion 15c of the upper float 15 is made of rubber, and hence it is possible to increase its sealing performance at blocking the first communication hole 12a.

Furthermore, in the float valve V1 of this embodiment, the middle chamber R2 is extended downward so that the middle chamber R2 may cover the lower float chamber R3 for setting, the distance h indicated in FIG. 3, between the first air hole 19 and second lower air hole 22 as being equal to or less than 5 mm. Even if the fuel is fed into the fuel tank 8 at an extremely large flow rate (a fast fuel feeding speed), the above structure can stabilize the position LF of the fuel liquid level during fueling.

Figure 6:
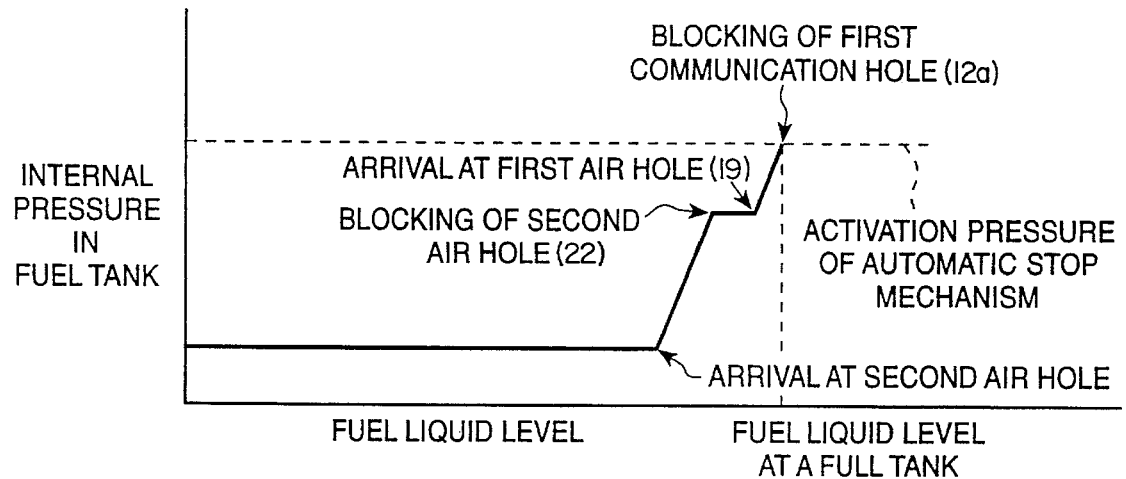
FIG. 6 is a graph showing the relationship between the internal pressure in the fuel tank and the fuel liquid level where the flow rate during fueling is small.

If the flow rate at the fuel feeding is small (for example, less than 15 minute), the relation between the internal pressure in the fuel tank and the liquid level is shown in FIG. 6. When the fuel liquid level arrives at the position of the second air hole 22, the internal pressure in the fuel tank starts to rise. Prior to the fuel liquid level arriving at the position of the first air hole 19, but after the opening of the second air hole 22 is blocked with the fuel F, the lower float 23 will subsequently block the third communication hole 17b. However, the internal pressure in the fuel tank is maintained at a regular value since air continues to be vented via the first air hole 19. After that, when the fuel liquid level arrives at the first air hole 19, the internal pressure in the fuel tank rises again, and forces fuel into the upper chamber R1 lifting upper float 15. When the upper float 15 rises enough to block the first communication hole 12a, the internal pressure in the fuel tank is raised to the back pressure value at which the fuel nozzle activates the automatic stop mechanism.

If the flow rate during fueling is small, even if the first air hole 19, that is located at the desired full tank position, is located about an upper portion of the side wall body 18b of the middle chamber R2 and further separated from the position of the second air hole 22, it is possible to similarly keep the internal pressure in the fuel tank gradually rising.

Figure 7:
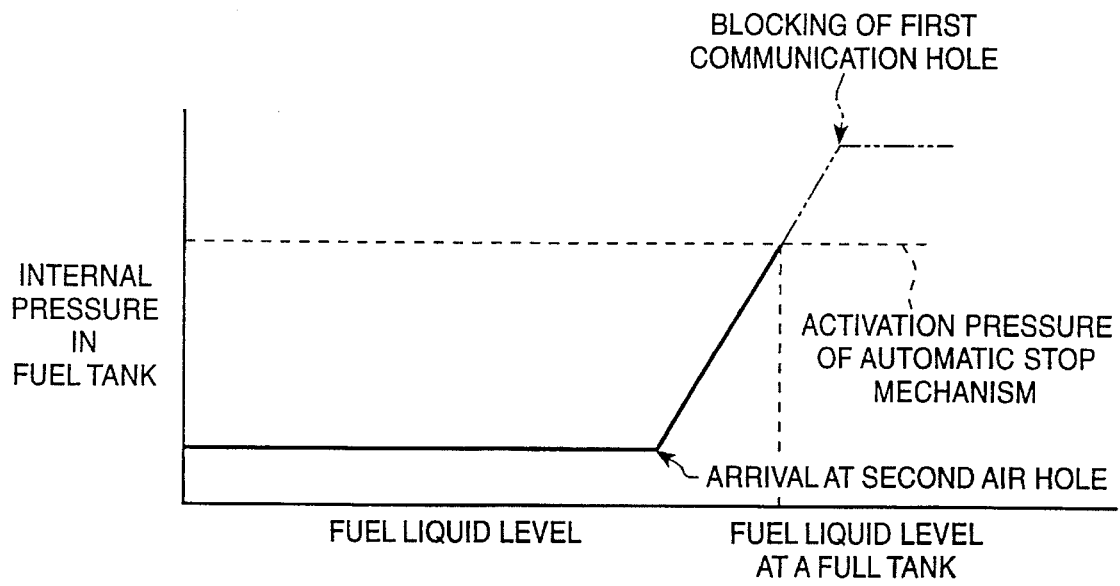
FIG. 7 is a graph showing the relationship between the internal pressure in the fuel tank and the fuel liquid level where the flow rate during fueling is extremely large.

On the contrary, if the flow rate at the fuel feeding is extremely large (for example, equal to or more than 45 minute), the relationship between the internal pressure in the fuel tank and the fuel liquid level becomes as shown in FIG. 7. That is, when the fuel liquid level arrives at the position of the second air hole 22, the internal pressure in the fuel tank gradually rises without passing through the step at which the internal pressure in the fuel tank is maintained at a regular or desired value. If the flow of fuel is too great the pressure value may activate the automatic stop mechanism before the upper float 15 blocks the first communication hole 12a.

In this case, if the distance between the first air hole 19 and the second air hole 22 is equal to or less than 5 mm, it is possible to reduce the period between the time when the internal pressure in the fuel tank 8 starts to rise and the time when the internal pressure in the fuel tank arrives at the predetermined value at which the fuel nozzle activates the automatic stop mechanism. Therefore, if the fuel liquid level arrives at the first air hole 19 that is located at the position equal to a full tank fuel liquid level, it becomes possible to stop fuel injection, and hence, if the flow rate at fuel feeding into the fuel tank 8 is extremely large (fast fuel feeding speed), it is possible to stabilize the fuel liquid level LF during fueling.

Where the float valve is installed in a fuel tank having a small flow rate at fuel feeding, it is possible to locate the first air hole 19 about an upper portion of the side wall body 18b of the middle chamber R2, where it is further separated from the position of the second air hole 22, without changing the middle chamber R2 which continues to cover the lower float chamber R3.

In addition, although, in this embodiment, the second air hole 22 is located in the lower side wall 21 of the lower float chamber R3, the second air hole 22 can be located in the fourth side wall 20 so long as the second air hole 22 remains lower than the lower float 23.

Further, in this embodiment, since the opening area of the first air hole 19 is smaller than that of the second air hole 22, when the lower float 23 blocks the third communication hole 17b, it is possible to maintain the rise of the internal pressure in the fuel tank within the range where the fuel nozzle does not activate the automatic stop mechanism.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A float valve positioned between a fuel tank and an air bleed duct, to vent the tank air during fueling and to stop air flow at a full tank fuel liquid level, said float valve comprising a case including an upper float chamber, a middle chamber, and a lower float chamber, said case being fixed to an upper wall of a fuel tank, said upper float chamber including a first wall having a first communication hole formed therein in open communication with an air bleed duct, a second wall, located below and spaced from said first wall, having a second communication hole formed therein in open communication with said middle chamber, and an upper side wall connecting said first wall to said second wall, said upper float chamber enclosing an upper float member provided with a seal that can block said first communication hole, said middle chamber including said second wall, a third wall, located below and spaced from said second wall, having a third communication hole formed therein in open communication with said lower float chamber, and a middle side wall connecting said second wall to said third wall, said middle chamber having a first air hole formed therein located at a full tank fuel liquid level on said middle side wall, said lower float chamber including said third wall; a fourth wall located below and spaced from said third wall; and a lower side wall connecting said third wall to said fourth wall, said lower float chamber enclosing a lower float member that can block said third communication hole, said lower float chamber further including a second air hole located below and spaced from said lower float.

2. A float valve for the fuel tank as claimed in claim 1, wherein said middle chamber is extended downward so that said middle chamber may cover said lower float chamber, and the distance between said first air hole and said second air hole, which is located lower than said first air hole, is equal to or less than 5 mm.

* * * * *